No. 737,298. PATENTED AUG. 25, 1903.
O. TUCH.
ENGINE INDICATOR.
APPLICATION FILED JUNE 12, 1902.
NO MODEL.
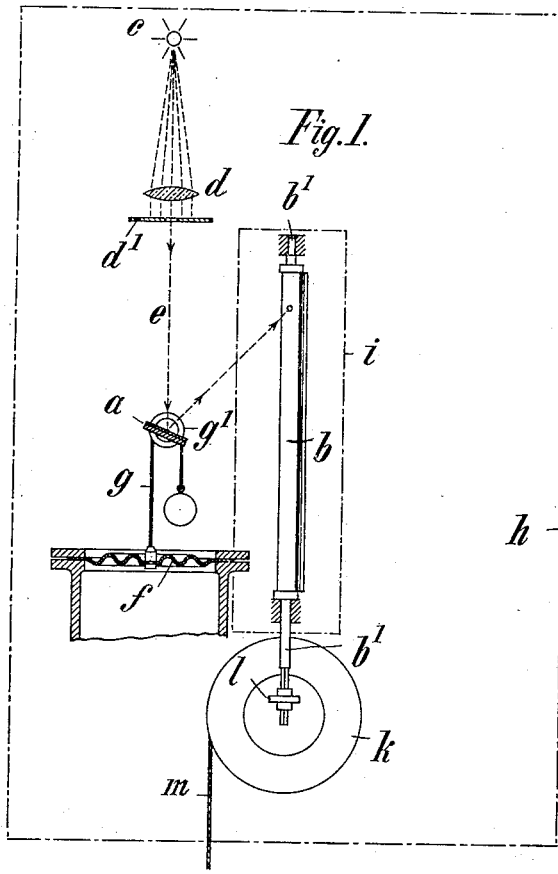
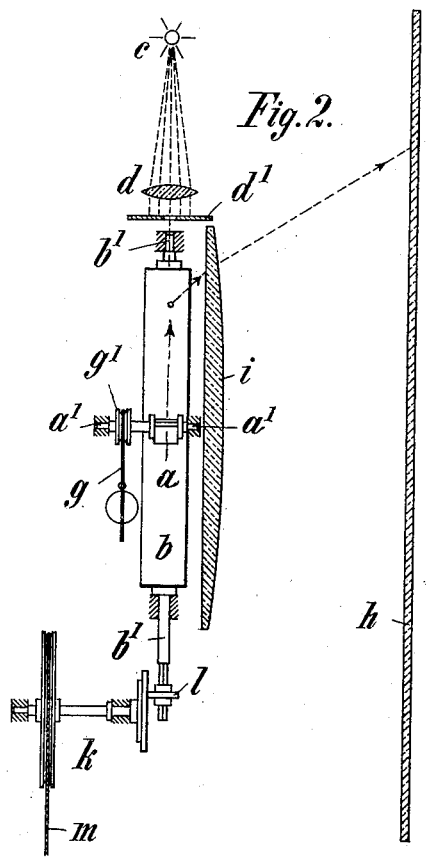
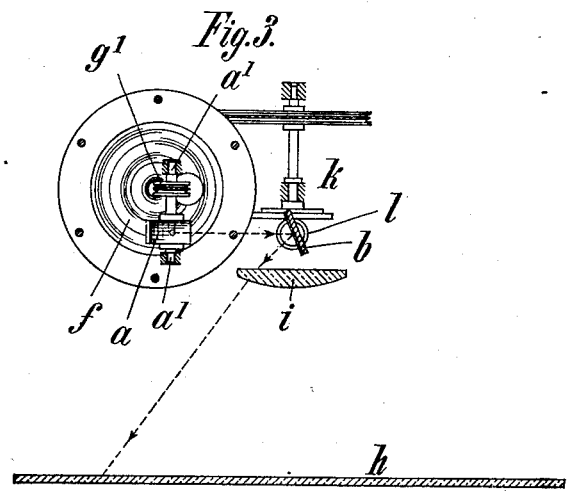
Witnesses:
Inventor
Otto Tuch
By
Attys.

No. 737,298. Patented August 25, 1903.

UNITED STATES PATENT OFFICE.

OTTO TUCH, OF HAMBURG, GERMANY.

ENGINE-INDICATOR.

SPECIFICATION forming part of Letters Patent No. 737,298, dated August 25, 1903.

Application filed June 12, 1902. Serial No. 111,411. (No model.)

*To all whom it may concern:*

Be it known that I, OTTO TUCH, a subject of the German Emperor, and a resident of Hamburg, in the German Empire, have invented certain new and useful Improvements in Engine-Indicators, of which the following is a specification.

The attempts heretofore made to construct mirror-indicators for recording or making visible diagram-curves by reflection have failed, because only one mirror was employed. If such a mirror is arranged so that it is adapted to be rotated or rocked by means of a pressure-gage spring and of a moving part of the machine in two planes at right angles one to the other simultaneously, the rotations or rocking motions which the pressure-gage spring tends to produce and those caused by the moving-machine part are mutually disturbing or deranging each other, and consequently a faulty diagram results. In order to compensate these inaccuracies, special devices must be provided which increase the moving masses beyond those required in the indicator mechanism hitherto employed instead of reducing same.

According to the present invention the improved engine-indicator is provided with two mirrors, which are rotatable upon spindles or journals arranged at right angles to each other and capable of being moved or rocked independently of each other. Owing to the fact that the two mirrors of my improved indicator are caused to rock independently one of the other, mutual disturbances are avoided, each mirror is always perfectly adjusted, and the masses to be moved or displaced are reduced to the possibly smallest amount—that is to say, to the masses of the said small mirrors and their journals.

In order that my invention may be more fully understood by one skilled in the art to which it appertains, I shall now proceed to describe the same in detail, reference being taken to the accompanying sheet of drawings, wherein—

Figure 1 is a side elevation, partly in section, of my improved two-mirror indicator device. Fig. 2 is a similar elevation, partly in section, taken at right angles to the elevation shown by Fig. 1; and Fig. 3 is a top view or plan, partly in section, of the improved indicator device.

Similar letters refer to similar parts throughout the several views.

The mirrors $a$ and $b$ are provided with journals $a'$ and $b'$, respectively, the said journals being mounted in suitable bearings, so that the center lines of rotation of the said mirrors are at right angles to each other. A pencil of rays is obtained from a suitable source of light $c$ by means of a lens $d$ or shutter arrangement $d'$, respectively. This luminous pencil $e$ is of small cross-section and may be considered as one ray. This ray first of all impinges upon the first swinging mirror $a$, which is rocked about its axis of rotation or its journals $a'$ by the pressure-gage $f$ of the indicator by the intermediary of a weighted cord $g$, passing over a grooved pulley $g'$, mounted on one of the mirror-journals $a'$. The ray of light $e$ is thrown by the mirror $a$ upon the second mirror $b$, which is caused to rotate or to rock about its journals $b'$ by means of an appropriate gear $m\ k\ l$, acted upon by the cross-head or other suitable part of the engine. Both mirrors $a$ and $b$ are consequently rocked independently of each other by separate devices, whereas in the known mirror-indicators having but one swinging mirror this latter is rocked or moved by the simultaneous actions of the spring of the pressure-gage and of the driving-gear operated by the moving or reciprocating engine part. The mirror $b$ reflects the ray $e$ in well-known manner upon a suitable surface $h$, which may be a ground-glass plate, for example; but as the curve there described would be distorted, as the actual curve lies upon a rotary surface, a lens $i$ is interposed between the mirror $b$ and the surface $h$. The same result may be obtained by giving the mirror-surfaces a corresponding curvature or by kinematically connecting the mirrors with the indicator pressure-gage and the moving part of the engine, respectively, in such a manner that the components of the path of the points of light are proportional to the pressure of the pressure medium and to the strokes of the piston or other moving part of the engine employed. The diagram-curve may be recorded photographically by means of a film, or when the sensitized film is replaced by a translucent diaphragm the luminous point producing the curve may be observed from the back traveling over the diaphragm. In the case of machines running with some velocity (at one hundred and fifty revolutions per minute and upward) the whole of the curve may be seen during the operation of the engine.

In order to alter the amplitude of the rocking motion of the mirror $b$, which amplitude corresponds to the piston-stroke, a friction-gear $k\ l$ may be used, as the masses are so small. By displacing the roller $l$ upon the journal $b'$ of the rocking mirror $b$ the amplitude of the latter may be varied as desired.

It will be understood that the connection of the two mirrors with the engine may be interchanged, so that the mirror $a$ is rocked by a reciprocating part of the engine and the mirror $b$ by the pressure-gage $f$. Moreover, it may be observed that (as in former well-known optical engine-indicators using a single mirror) a spherical mirror or lens may be provided for converging the small pencil of parallel rays, so as to unite the rays in one point in the plane of the diaphragm-surface.

Having fully described my invention, what I claim, and desire to secure by Letters Patent, is—

1. An engine-indicator, comprising an indicator-surface, a pressure-operated reflector, a second reflector operated by a moving element, and a source of light to reflect a beam from one reflector to the other and thence to the indicator-surface, substantially as described.

2. In an engine-indicator, the combination with a source of light and a record-surface, of two transversely-arranged reflectors interposed between said light and record-surface, and a pressure-operated device for controlling one reflector, and a moving element for controlling the other reflector, substantially as described.

3. In an engine-indicator, the combination with a source of light and a record-surface, of two transversely-arranged reflectors interposed between, and adapted to, reflect the light from the source onto said surface, a pressure-operated device, mechanism controlled by said device adapted to rock one of said reflectors and mechanism controlled by a moving element to independently rock the other reflector, substantially as described.

4. In an optical engine-indicator, the combination with a source of light and a record-surface, of a mirror, a lens between said mirror and light, a pressure-operated device for rocking said mirror, a second mirror adapted to receive the reflected rays of the first mirror, and a moving element connected to and adapted to rock said second mirror, substantially as described.

5. The combination of a reflector, a pressure-operated device for rocking the same, a source of light, a lens interposed between the light and reflector, a shutter interposed between the lens and reflector, a second reflector mounted transversely to the first reflector, a moving element to rock the second reflector, and an indicator-surface, substantially as described.

6. The combination of a reflector, a pressure-operated device for rocking the same, a source of light, a lens interposed between the light and reflector, a perforated shutter interposed between the lens and reflector, a second reflector mounted transversely to and adapted to receive the reflection from the first reflector, a moving element, mechanism operated by the same for rocking the second reflector, an indicator-surface, and a lens between said surface and second reflector, substantially as and for the purpose specified.

OTTO TUCH.

Witnesses:
MAX LEMCKE,
THEODOR MÜLLER.